E. Reynolds.
Lithographic Press.
N⁰ 43796.    Patented Aug. 9. 1864.

Witnesses.                                    Inventor.
                                              Edwin Reynolds E. Reynolds.
Lithographic Press.
Nº 43796. Patented Aug. 9. 1864.

Witnesses.
J. B. Crosby
T. Gould

Inventor.
Edwin Reynolds

UNITED STATES PATENT OFFICE.

EDWIN REYNOLDS, OF MANSFIELD, CONNECTICUT.

LITHOGRAPHIC POWER-PRESS.

Specification forming part of Letters Patent No. 43,796, dated August 9, 1864.

*To all whom it may concern:*

Be it known that I, EDWIN REYNOLDS, of Mansfield, in the county of Tolland and State of Connecticut, have invented an Improved Lithographic Power-Press; and I do hereby declare that the following, taken in connection with the drawings which accompany and form part of this specification, is a description of my invention sufficient to enable those skilled in the art to practice it.

This invention relates to the construction and arrangement of parts of a lithographic printing-press in which a stationary stone is used, the tympan being made to vibrate to and from the surface of the stone, and pressure of the tympan upon the stone being produced by a reciprocating scraper, platen, or pressure-bar.

Lithographic printing-presses differ from the common type and plate presses, in that instead of employing the ordinary platen, producing the pressure and impression simultaneously upon the whole surface, or upon a considerable breadth of surface of the sheet to be printed, the pressure is upon a line produced by what is called a "scraper," the stone being made to traverse under this scraper, which presses the tympan and its sheet to be printed upon the stone, or the stone being held stationary while the scraper traverses over it.

In Letters Patent No. 41,171, granted to me, and in Letters Patent No. 2?,519 and No. 37,727, and in some other presses, a revolving tympan, reciprocating stone, and stationary scraper were employed together; but in my present machine I make use of a stationary stone, traversing scraper, and revolving tympan.

The invention consists in the general organization and operation of the press, with a reciprocating damper and inking apparatus, a reciprocating scraper and vibrating tympan, and a stationary stone; also, in giving to the front ink-roller a forward movement above and out of contact with the stone and a back movement upon the stone; also, in the method of operating the tympan; also, in giving to the ink-rollers irregular lateral movements or degree of movements with respect to each other, to the distributing cylinder, and to the stone; also, in the method of operating the ink-roll and scraper carriages; also, in the method of interrupting or throwing out of action the tympan and scraper; also, in the mechanism for operating the nipper-fingers; also, in the method of adjusting the stone.

Figure 1:
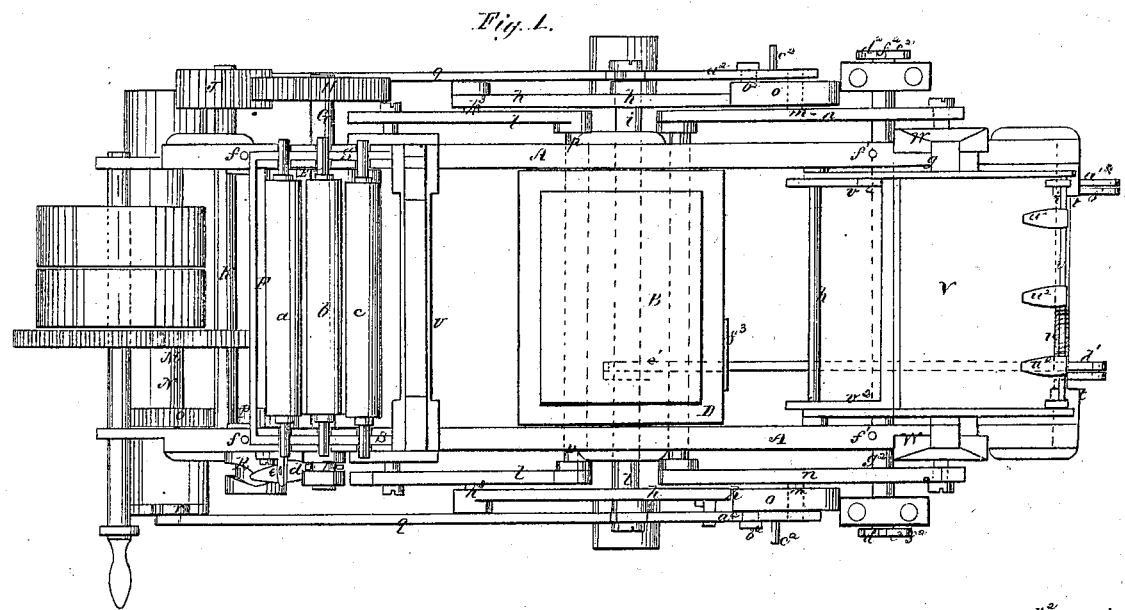
Figure 2:
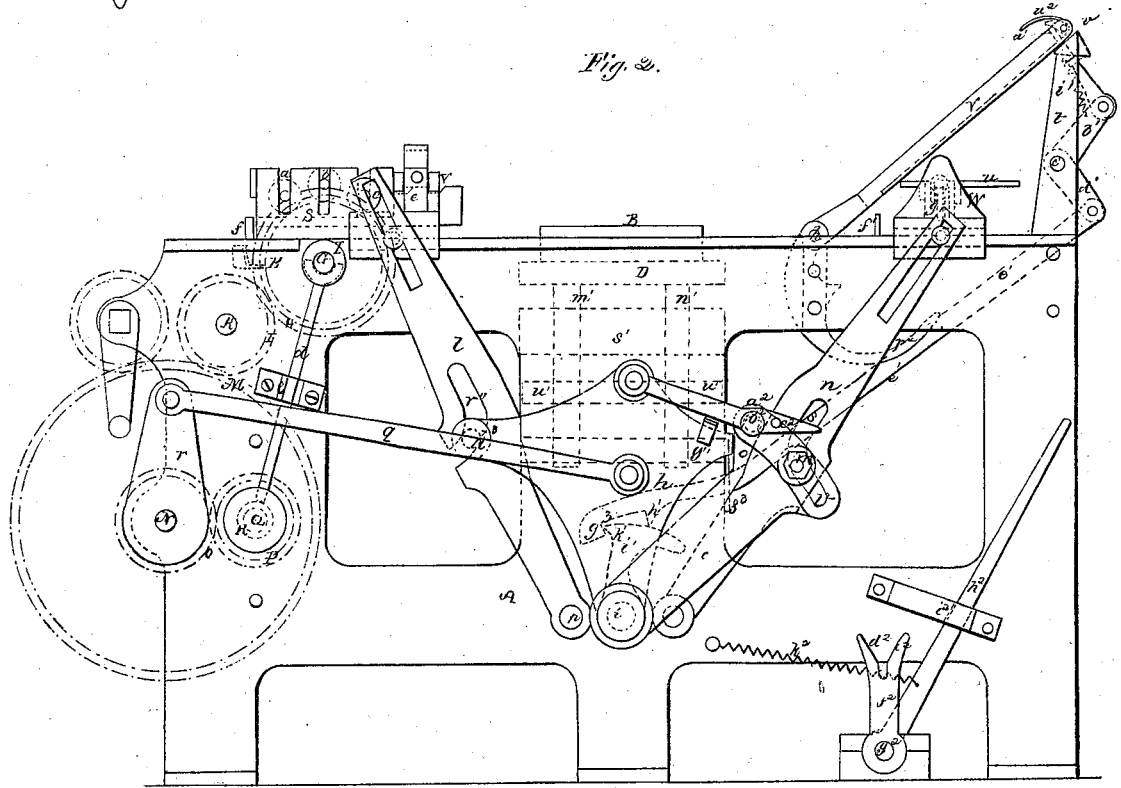
Figure 6:
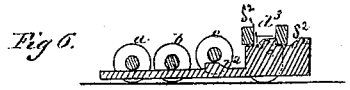
Figure 7:
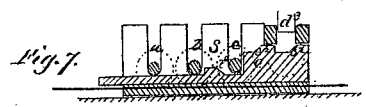
Figure 5:
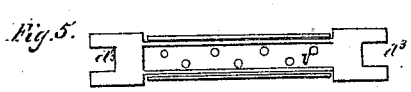
Figure 4:
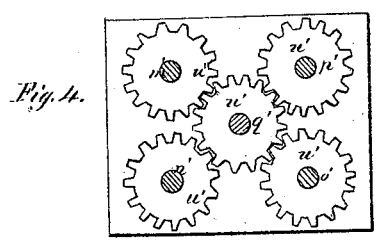
Figure 3:
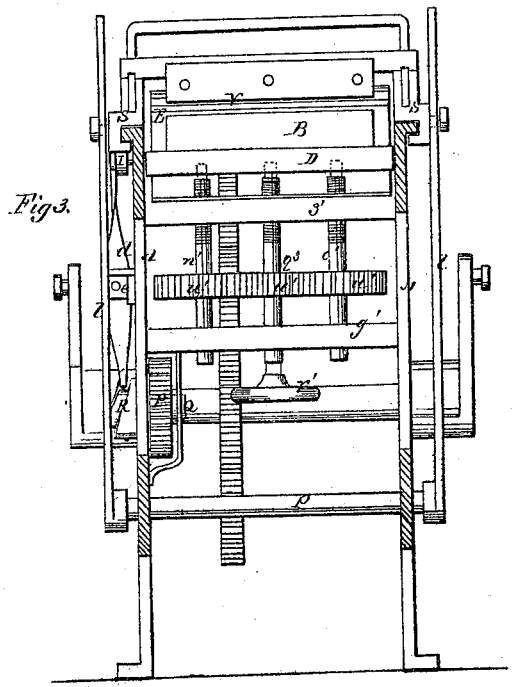

Figure 1 of the drawings denotes a top view of the press; Fig. 2, a side elevation of it; Fig. 3, a transverse section taken in rear of and so as to show the position of the stone, the damper, &c. Fig. 4 is a horizontal section of the elevating-screws for adjusting the stone. Fig. 5 is a top view of the damper. Figs. 6 and 7 are vertical sections of the incline or cam plate for working the front roller and the damper with reference to contact with and elevation above the stone.

A denotes the frame work of the machine; B, the stone mounted on a bed, D, which is supported on top of adjusting screw-shafts, as will be hereinafter described. E is the fountain or main ink-distributing cylinder, to which ink is supplied directly from the ink-fountain F, the cylinder distributing its ink to rolls *a b c*, which rest upon it, and which in turn roll and ink the stone B.

In the process of inking the stone it is of great importance to vary the lateral position of the rolls with respect to each other and to the surface of the stone in their successive movements over the stone, and also to vary their lateral movement in their contact with the cylinder E, in order that the ink shall be evenly and smoothly laid upon the rolls, and from thence transferred to the stone. As in lithographic printing much of imprint is of linear figures and characters, the ink is not removed from the ink-rolls so superficially as in most type-printing, but in lines, and hence the necessity of a wiping or spreading lateral movement of the ink on the rolls after they have left the stone, in order to remove these "line" effects. This is accomplished as follows: The cylinder E is placed on a horizontal shaft, G, which slides laterally in its bearings in the main frame, and has a gear, H, on one end, and on its other end a slotted collar, I. The gear H meshes into a wide-faced gear, J, on a shaft, K, which shaft carries another gear, L, to which motion is communicated by a gear, M, on the main shaft N. This shaft carries a small gear, O, which meshes into and operates a gear, P, on a short shaft, Q, carrying a cam, R. A lever, *d*, hung at *e*, has a fork or projection at its upper end projecting into the groove of the collar I, while at its lower end the lever extends into the cam-groove. Rotation of the shaft N drives the cylinder E, and the gear O rotates the gear P and cam R, and the cam-groove vibrates the lever $d$, and imparts a reciprocating lateral movement to the cylinder E, as will be readily understood. The rolls $a\ b\ c$ are journaled in a carriage, S, which slides upon the top of the frame A, and carries the rollers to and fro over the stone. The journals of the rolls rotate in slotted vertical bearings in the carriage, so that the rolls are capable of free vertical movements. They operate as friction-rolls, rotating when the carriage S is stationary over the ink-cylinder by the contact and rotation of said cylinder, the rolls all resting thereupon, and when the carriage is moving over the stone by contact with the surface of the stone. After the rolls have inked the stone and returned to their position on the cylinder E, it will be seen that they have imparted to them by the cylinder a lateral movement, and that when this lateral movement brings their ends against the inner side of the carriage they remain stationary, (laterally,) while the continued movement of the cylinder has the effect of smoothing the surface of the rolls and obliterating the lines made thereon from displacement of the ink by the lines on the stone; but to still further insure proper inking of the stone, I vary the relative positions of the rolls with respect to each other and to the surface of the stone at each successive rolling, which is done as follows: The cam-gear P is made a little smaller or larger than the gear O of the main shaft which drives it, so that each revolution of the main shaft gives a little more or less than a revolution to the cam; hence each time the ink-rolls leave the cylinder E the cylinder occupies a different position from its last, thus varying the positions of the rolls, which are controlled by the situation of the cylinder, and they also have a different position with respect to each other to their former one, because they go out of contact with the cylinder one after the other, lateral motion being imparted to the two rear rollers after the first leaves, and to the rear one after the second leaves the cylinder. Thus the ink is perfectly and smoothly distributed after each rolling, all lines are obliterated from the rolls, and all running of the rolls over the stone in the same track is prevented. This, in the common hand-printing from stones, is, of course, accomplished by the pressman by irregular movement of the roller by hand over the ink-bed, and it is to follow this irregularity automatically, so far as possible, that I give the irregular and lateral movements to the ink-roller. This is a matter of great importance, as it is only by perfect distribution of the ink that automatic presses can be made to print from stones as perfectly as by hand-printing. The front end of the carriage S carries the damper U, the frame of which is slotted, as seen at $d^3$ in Fig. 5, or is otherwise made capable of free vertical movement. It is necessary or desirable that the damper should rub over and dampen the surface of the stone in its forward movement and pass back over the inked surface afterward without contact, to effect which the ends of the damper box or frame rest upon sliding incline plates $e$, said plates extending through the carriage S, under the journals of the ink rolls, and being operated by the movement of the carriage and two stop-pins, $f f'$, rising from the top of the frame. The action of the inclines $s^2$ will be readily understood from Figs. 6 and 7. When the carriage is moving forward toward and so as to carry the damper over the stone, the inclines $s^2$, in the position shown in Fig. 6, the damper being in contact with the surface of the stone, as shown by the red line, as the carriage reaches the extent of the forward movement the front end of the incline plate strikes the pin $f'$, which presses the inclines under the ends of the damper-box, and raises the dampers so that in its back movement it is out of contact with the stone; and as the carriage reaches the end of its return movement the plates $e$ strike the pins $f$, which push back the plates and let the damper down. It is also desirable that the front roller should not roll the stone until on its return movement over the same, as in the forward movement of the rolls they absorb most of the moisture upon the stone, and by keeping the front roller above the stone in its advance, and bringing it down as it traverses back, the fresh roller goes over and rolls the stone the last thing before the impression is taken. I therefore apply to the plates $e$ inclines $t^2$, at the bottom of which the journals of the front roller rest when it is on its return movement, and the pin $f$ pressing the journals up the incline so that they rest on top thereof and keep the roller above the stone in its advance. The tympan which carries the sheet is shown at V, and the scraper or reciprocating platen at $g$. The tympan-frame is hung and swings upon a rod or shaft, $h$, and is operated directly by the scraper-carriage W.

I will now proceed to describe the mechanism by which the reciprocating horizontal movements of the ink-roll and damper carriage S and the scraper-carriage W and the vibrating movements of the tympan are effected. On each side of the machine is an oscillating plate, $h$, hung upon a cross-shaft, $i$. Each plate has on one side a pin, $h^3$, which actuates a working arm or lever, $l$, jointed to the carriage S, and on the other side a pin, $m$, which works a rocking arm or lever, $n$, jointed to the scraper or platen carriage W. The pin $m$ does not project directly from the oscillating plate, $h$ but from an auxiliary plate or arm, $o$, fastened to and moving in common with said plate $h$, excepting as will be hereinafter described. Each lever $l$ vibrates on a shaft, $p$, and is jointed to the carriage S by a pin projecting from the carriage through an elongated slot in the lever. The carriage W is similarly jointed to its levers $n$, as will be readily understood from Fig. 2. Motion is communicated to the oscillating plate $h$ by a connecting rod, $q$, jointed to a crank, $r$, on the main shaft and to the center of the plate $h$.

The pins $h^3$ and $m$ work in slots $r''$ and $s$ in the levers $l$ and $n$, which open out, respectively, from the sides of the levers, and the levers and their carriages operate as follows: Supposing the carriages S and W to be at the extremity of their outward movement, as shown in Fig. 2. As the shaft and its crank are rotated, the pin $h^3$ carries up the arm $l$ and imparts a forward movement to the carriage S, with its damper and ink-rolls, the pin $m$ meantime leaving the slot $s$, and the carriage W remaining stationary. The levers $l$ then carry back the carriage S, and as the carriage reaches the end of its back movement the pin $h^3$ will leave its slot, and the pin $m$ pass into the slot $s$, the continued movement of the oscillating plate causing said pin $m$ to move its lever and the carriage W, with the scraper, toward and over the stone, and then back again, (the carriage S remaining meanwhile stationary.) Thus it will be seen that though the plate $h$ actuate both of these carriages, it only moves one at a time, the carriage W remaining stationary during the traverse of the carriage S, and vice versa. The movement of the scraper-carriage effects the vibrations of the tympan, as follows: The tympan-frame, when at rest, is supported by standards $t$ and in juxtaposition with the carriage W. As the carriage moves toward the stone, it lifts the tympan-frame until the tympan assumes a vertical position, when projections $u$ from the rear of the carriage are brought into contact with curved arms $v^2$, extending from the rear of the carriage W, and these arms or projections guide or control the descent of the tympan upon the stone. As the tympan and its sheet lie upon the stone, the scraper or platen passes forward and back over it, and as the projections $u$ again come into contact with the arms by movement against them they elevate the tympan frame until it reaches a vertical position, when it falls over and descends by gravity onto the standards $t$, supported in its descent by the carriage W. Nipper-fingers $u^2$ grasp the sheet or hold it upon the tympan, and release it at proper times, as follows: They are affixed to a rod or shaft, $v$, which turns in bearings on opposite sides of the top of the tympan frame, and a spring, $w$, tends to hold them in contact with the tympan. When at rest, they are held up from the tympan by a pin, $a'$, which passes through the top of one of the standards $t$, and, pressing against a projection from the nipper rod, turns the rod and elevates the fingers, the weight of the tympan and frame being such that the frame drops against the standards, while the pin $a'$ holds up the fingers in position to allow the edge of the blank sheet to be slipped under them. The pin $a'$ is jointed to an arm, $b'$, on a rocker-shaft, $c'$, which carries another arm, $d'$, as seen in Fig. 2, the arm being jointed to a long rod, $e'$, extending down within the frame-work A, and through a slot in a plate, $f^3$, which extends from the lower bed-piece, $g'$, through which the elevating screws work. This arm has a hook or catch, $g^3$, and a projection, $h'$, which are operated by a dog-plate, $i'$, on the shaft of the oscillating plate $h'$. The pressman having placed the sheet on the tympan, as the carriage S completes its rear movement, and just before the tympan begins to move, the point $k'$ of the dog-plate $i'$ catches into the hook $g^3$ and carries forward the arm $d'$, turns the shaft $c'$, and depresses the pin $a'$, which allows the fingers to close down upon and hold the sheet. The arm is carried forward until the top and eccentric surface of the dog-plate comes in contact with the projection $h'$, and, lifting the arm, releases the hook or catch, when a spring, $l'$, draws up the pin $a'$ into its normal position, projecting above the standard, ready to lift the nipper fingers and release the sheet upon the return of the tympan. As the carriages S and W travel upon the top of the frame A, and the movements of the ink-rollers, the damper, and the scraper are in a fixed horizontal plane, or with no capability of adjustment with respect to the surface of the stone, the bed D is made adjustable, so as to raise or lower the stone placed upon it until its surface is at the proper height for the scraper, damper, and rolls. For this purpose the bed is placed upon the tops of five screw-shafts, $m'$, $n'$, $o'$, $p'$, and $q'$, (see Fig. 4,) the center one, $q'$, carrying a left-threaded screw and the other four right-threaded screws. The screw $q'$ has a hand-wheel, $r'$, on its lower end. These screws work through female screws in a stationary cross-plate, $s'$, and are supported in position at their lower ends by another plate, $g'$, through which the screw-shafts slide. Each shaft has a gear, $u'$, the four outer gears meshing into and being operated by the center one, so that by turning the hand-wheel $r'$ all five screw-shafts are elevated or lowered equally, raising or depressing the stone, as may be requisite, the ease and facility of operating the four outer and the center shafts, all bearing upon the bed, by turning the center shaft rendering the operation of adjusting the stone very simple.

In adjusting the stone and in inking it, it is oftentimes desirable to dispense with the operation of the scraper and tympan and have movement only imparted to the carriage S, with its damper and ink-rolls. For this purpose I so apply the part $o$ of the oscillating plate $h$, which carries the pin $m$ and drives the arm $n$, that it may be disconnected from the plate $h$, so that the arm $n$ and carriage W will remain at rest. A hook or arm, $a^2$, is jointed to the plate $h'$, and hooks over a pin, $b^2$, on the arm $o$, the hook and pin confining the plate $h$ and arm $o$ together as one when both carriages are operating. A pin, $c^2$, projects from the hook $a^2$. When at the lower part of the throw of the arm $o$, this pin passes between two incline faces, $d^2$ $c^2$, of an upright plate, $f^2$, affixed on each end of a cross-shaft, $g^2$. A switch-lever, $h^2$, operates this shaft and turns the plates $f^2$ back into the position seen in Fig. 2. When we wish to discontinue the movement of the tympan and scraper, the switch-lever $h^2$ and plate $f^2$ are turned back and fastened by a catch, $i^2$. Now, as the pin $c^2$ descends it strikes the incline $d^2$, which unhooks the hook $a^2$ from its pin $b^2$, so that as the oscillating plate $h$ goes back it leaves the arm $o$ behind, and the lever $n$, scraper, and tympan remain stationary. Each time the hook $a^2$ returns, the pin $b^2$ and incline $d^2$ keep the hook from clutching with the pin $a^2$ until the switch-bar is released from its position, and the spring $k^2$ carries it and the plate $f^2$ back to their normal position. When the hook now comes down, the pin $b^2$ strikes the other incline, $e^2$, the position of which forces the hook under the pin $a^2$ and connects the plates $h$ and $o$ together again.

In order to vary the extent of movement of the scraper-carriage W to correspond with the extent of surface of stone to be printed from, the pin $m$, which actuates lever $n$, is made adjustable. It passes through a slot, $l^2$, in which it is fastened by a screw and nut, as shown in Fig. 2. The extent of oscillation of the arm $o$ is always the same; but if the screw-pin is carried to the opposite end of the slot to that shown it will, of course, diminish the extent of throw of the lever $u$ and the scraper.

In the ordinary construction and operation of presses the sheet is fed in or upon the type, plate, or stone by or upon the tympan, and after the impression it is removed in the opposite direction or upon another frame or carriage suitably placed and operated with respect to the bed. With my arrangement, however, the tympan-fingers retain their hold upon the sheet and bring it back to its first position after the impression is made, the fingers releasing their hold as the tympan reaches such position. By this means the pressman always sees the impression and knows from it whether or not the stone is in good working order and is being properly inked and damped. This manner of printing from a stone is preferable to the use of a rotary tympan, because the whole sheet remains in contact with the stone during the back and forward movement of the scrapers, and more time is given for the sheet to absorb such amount of ink as shall give a distinct impression, whereas with the rotating tympan the contact and removal of the part of the sheet being printed is almost instantaneous.

The manner of driving the carriages S and W by disconnecting the plate $h$ from one lever while it operates the other equalizes the power of the machine, and causes the smallest possible amount of strain upon the frame-work.

I claim—

1. Regulating the throw of the scraper by means of the set-screw pin $m$ and adjusting-slot $l^2$, as described.

2. The employment of a distributing-cylinder and ink-rollers, $a$ $b$ $c$, when having irregular lateral movements imparted to them, substantially as and for the purpose set forth.

3. Giving to the front roll, $c$, a forward movement above and out of contact with the stone, and a back movement upon the stone, substantially as specified.

4. Giving to the roll $c$ and to the damper their vertical movements by the sliding incline plates, as set forth.

5. The method of operating the carriages S and W by one oscillating plate, $h$, (or one on each side of the machine,) actuating the two levers $l$ $n$, substantially as set forth.

6. In a machine organized with a stationary bed, reciprocating rolls, damper, and scraper, and a vibrating tympan working the roller and damper-carriage and the tympan and scraper-carriage alternately, the mechanism on one side of the stone being stationary while that upon the opposite side is operating.

7. The manner of interrupting or throwing out of action the tympan and scraper, substantially as shown.

8. The mechanism for operating the nipper-fingers, closing them upon the sheet as the tympan begins to move, and opening them and releasing the sheet when the tympan returns to its normal position, substantially as set forth.

9. Actuating the tympan by the scraper, curved arm $v$, and projection $u$, operating substantially as set forth.

10. Adjusting the stone by means of a series of elevating screw-shafts geared to and operated by a center screw-shaft, substantially as described.

11. The combined employment of the tympan and nippers for the double purpose of carrying the sheet to the stone and back thereform to its first position.

EDWIN REYNOLDS.

Witnesses:
  J. B. CROSBY,
  F. GOULD.